Patented Apr. 30, 1940

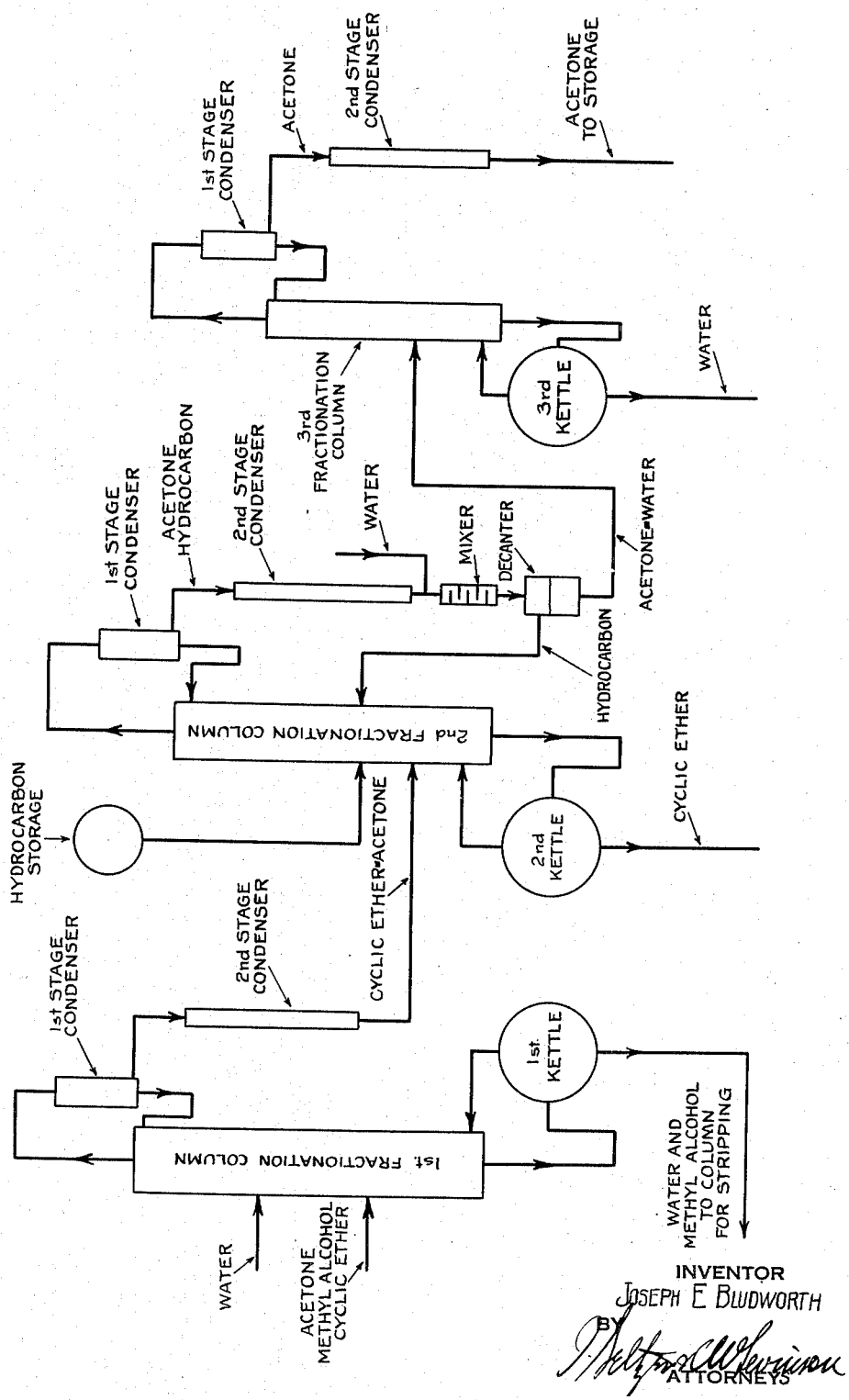

2,198,651

UNITED STATES PATENT OFFICE 2,198,651

ORGANIC COMPOUND

Joseph E. Bludworth, Cumberland, Md., assignor to Celanese Corporation of America, a corporation of Delaware Application October 31, 1936, Serial No. 108,548

6 Claims. (Cl. 202—42)

This invention relates to the separation and recovery of the components of a constant boiling mixture composed for the most part of acetone and alcohol or acetone, or alcohol and an unsaturated compound, or acetone and an unsaturated compound.

An object of the invention is the economic and expeditious recovery in a concentrated and uncontaminated condition of the individual components of a ternary or binary azeotropic mixture containing acetone together with an alcohol or an unsaturated compound or both. Another object of the invention is the extraction of methyl alcohol from a mixture of acetone, methyl alcohol and a cyclic ether. A still further object of the invention is the separation of acetone and an unsaturated compound such as a cyclic ether. Other objects of the invention will appear from the following detailed description.

A constant boiling mixture of methyl alcohol, acetone and an unsaturated compound or compounds is formed in industries where hydrocarbons are partially oxidized, in the wood by-products industry and other industries such as the paint and varnish industry. Due to the cost and loss in separating the components, this mixture was marketed as such for a period of time but its uses were limited. In the separation of the ternary mixture by methods employed prior to this invention, such as the sulphuric acid process, the cost of the acid employed in the process amounted to almost the value of the resulting products. Also, the acid reacts to some extent with the acetone and thus destroys an appreciable portion of the most desired product. The acid also will destroy completely the unsaturated products. The separation of the ternary mixture, made in accordance with this invention, yields at a very low cost the individual components in a substantially pure state. This invention, therefore, gives life to industries which were held back due to the need of an inexpensive method of separating such ternary and binary mixtures.

In accordance with my invention I separate a constant boiling ternary mixture of alcohol, acetone and an unsaturated compound or compounds by the addition of an extractant or withdrawing agent that removes the alcohol from the ternary mixture, thus forming two binary mixtures, namely the extractant or withdrawing agent and alcohol as one azeotropic binary mixture, and acetone and the unsaturated compound or compounds as the other binary mixture. As the extractant or withdrawing agent for the methyl alcohol is preferably water, these may be separated by methods well known in the art. Also, in accordance with this invention, I separate the binary mixture of acetone and an unsaturated compound or compounds by an extractant or withdrawing agent for the acetone and then absorb the acetone in water to remove it from the extractant or withdrawing agent. The extractant for the acetone is preferably a saturated hydrocarbon and can therefore be easily decanted from the water/acetone mixture. The water and acetone may be separated by distillation.

The ternary or binary mixtures may be the mixtures obtained in the destructive or partially destructive distillation of wood, chemical processes for producing compounds from wood or other vegetable matter, processes for producing compounds from coal by combustion, partial combustion or by chemical methods, processes for producing compounds by the partial oxidation of petroleum oils and gases, and from the manufacture of various articles, paints and varnishes, or from natural or synthetic resins, etc. For instance, in the partial oxidation of butane and similar hydrocarbons there is formed a constant boiling mixture consisting of methyl alcohol, acetone and a cyclic ether. A similar mixture is also produced in the wood by-products industries. This invention is especially applicable for the separation into its components of the mixtures produced in these two industries.

The alcohol component of the ternary or binary mixtures may be methyl alcohol, ethyl alcohol and the like. The unsaturated compound or compounds of the ternary or binary mixture may be the cyclic ethers, aldehydes, polymers of either the cyclic ethers or the aldehydes, polymers of the mixtures of cyclic ethers, aldehydes and/or polymers of the cyclic ethers and aldehydes with alcohols. The term "cyclic ethers" is meant to include ethylene oxide, isobutylene oxide, tetramethylene oxide and their homologues and isomers.

The invention will now be described with reference to the drawing wherein there is diagrammatically shown one apparatus for effecting the separation of the ternary mixture comprising methyl alcohol, acetone and tetramethylene oxide. It is to be understood, however, that the invention is to be in no way limited by the specific disclosure in the drawing and the description made in reference thereto.

The ternary mixture—acetone, methyl alcohol and tetramethylene oxide—is fed continuously to the first fractionation column at a point about one-third the way from the bottom. About two-thirds of the way from the bottom water is added to the column. The kettle of the first column is maintained at about 142° F.; the column vapor temperature is maintained at about 131° F. and the condenser temperature at about 92° F. Since the temperature in the first fractionation column is below the boiling point of water but above the boiling point of the binary mixture of acetone and tetramethylene oxide, the water acting as an extractant for the methyl alcohol flows out of the base of the kettle while the acetone and tetramethylene oxide are vaporized and leave the column as a gas to be condensed, after removal in the first stage condenser of entrapped water vapor, in the second stage condenser connected with the first fractionation column. In the first fractionation column, therefore, the ternary mixture, by the addition of water, is formed into two binary mixtures which may be separated by distillation. One binary mixture contains water and methyl alcohol which may be withdrawn from the system as a liquid and passed to an extraction column for stripping the methyl alcohol from the water or to any other suitable extractor devices, many of which are known in the art; while the second binary mixture containing acetone and tetramethylene oxide is passed to a second fractionation column.

The binary mixture of acetone and tetramethylene oxide is fed to the second fractionation column at a point about one-quarter the distance above the bottom thereof. A hydrocarbon, preferably pentane, is added to the second fractionation column at about the center thereof. The kettle of the second fractionation column is maintained at about 135° F., the vapor temperature in the column at about 92° F. and the condenser at about 85° F. Since pentane boils at 100° F. and since the new binary mixture composed of acetone and pentane, now found in the second fractionation column, boils at 92° F., the new binary mixture passes from the second fractionation column as a gas and, after passing through the first stage condenser it is condensed in the second stage condenser. The tetramethylene oxide accumulates in the kettle of the second fractionation column and may be withdrawn from the system continuously or periodically as desired. Thus, in the second fractionation column the tetramethylene oxide is removed from the system and a new binary mixture of acetone and pentane is formed.

Cold water is mixed with the new binary mixture, which water extracts or absorbs the acetone very efficiently. Since the pentane is immiscible with the water/acetone mixture, it may be decanted and returned to the pentane storage tank or the second fractionation column for re-use; while the mixture of acetone and water is fed continuously to a third fractionation column at a point about one-third the distance from the bottom of the said column. The kettle of the third column is maintained at about 147° F., the vapor temperature in the column at about 132° F. and the condenser temperature at about 92° F. By the application of heat in the third fractionation column the acetone is driven from the water, the water being withdrawn from the kettle while the acetone passes from the fractionation column as a gas and is condensed to a liquid in the first and second stage condensers from which it may be led to storage.

The amount of water introduced into the first fractionation column should be a little more than sufficient to extract all of the alcohol. The amount of water to be employed may be ascertained by analysis of the product of the second stage condenser connected with the first fractionation column. If the amount of water is insufficient a part of the original ternary mixture will distill over, that is, some of the alcohol will be present in the product. If a very large excess of water is employed there will be no selective affinity between the acetone and alcohol for the water and the water will, therefore, extract a part of the acetone.

Although water has been stated as the preferred extractant to be used in the first fractionation column, there may be employed aqueous solutions of sodium or potassium thiosulphate, sodium or potassium carbonate, etc. when polymerization of a part of either the acetone or the unsaturated compound or compounds is not objectionable. Dilute acid solutions such as dilute acetic acid may also be employed. In place of pentane, there may be introduced in the second fractionation column, any of the lower boiling hydrocarbons, such as butane, hexane, etc.

It is to be understood that the type of fractionation columns, kettles, condensers, mixers, decanters, etc. may vary in construction and relationship to each other from those shown in the drawing without departing from the spirit of this invention. It is to be understood that the foregoing detailed description and drawing is given merely by way of illustration and that many variations may be made therein without departing from the spirit of my invention.

Having described my invention, what I desire to secure by Letters Patent is:

1. A method of separating mixtures of a water-soluble alcohol, acetone, and a substance selected from the group which consists of aldehydes, cyclic ethers including olefine oxides, and polymerization products made therefrom, which substances form a ternary constant boiling mixture, which comprises adding to the mixture an aqueous extractant for the alcohol at a temperature below the boiling point of the binary constant boiling mixture of the alcohol and water but above the boiling point of the other binary constant boiling mixture formed, removing the water-alcohol mixture in the liquid phase, distilling off the other binary mixture, adding thereto a normally liquid light paraffin hydrocarbon which is capable of forming a binary mixture with acetone and distilling off said mixture.

2. A method of separating a mixture of a water-soluble alcohol, acetone and a cyclic ether, which substances form a ternary constant boiling mixture, which comprises adding to the mixture an aqueous extractant for the alcohol at a temperature below the boiling point of the binary constant boiling mixture of water and the alcohol but above the boiling point of the binary constant boiling mixture of acetone and the cyclic ether, removing the water-alcohol mixture in the liquid phase, distilling off the acetone-cyclic ether mixture, adding thereto a normally liquid light paraffin hydrocarbon, and distilling off the constant boiling mixture formed by the acetone and the hydrocarbon.

3. A method of separating into i's components a mixture of methyl alcohol, acetone, and tetramethylene oxide, which substances form a ternary constant boiling mixture, which comprises adding to the mixture an aqueous extractant for the alcohol at a temperature below the boiling point of the binary constant boiling mixture of water and the alcohol but above the boiling point of the binary constant boiling mixture of acetone and tetramethylene oxide, removing the water-alcohol mixture in the liquid phase, distilling off the acetone-tetramethylene oxide mixture, adding thereto pentane and distilling off the constant boiling mixture formed by the acetone and the pentane.

4. A method of separating mixtures of a water-soluble alcohol, acetone and a substance selected from the group which consists of aldehydes, cyclic ethers including olefine oxides, and polymerization products made therefrom, which comprises feeding the mixture and water into a column maintained at a temperature below the boiling point of the binary constant boiling mixture of water and the alcohol and above the boiling point of the other binary constant boiling mixture formed, removing the non-alcoholic mixture in the vapor phase and the aqueous alcohol in the liquid phase, adding to the non-alcoholic mixture a normally liquid light paraffin hydrocarbon, and distilling off the constant boiling mixture formed by the acetone and the hydrocarbon.

5. A method of separating into its components a mixture of a water-soluble alcohol, acetone and a cyclic ether, which substances form a ternary constant boiling mixture, which comprises feeding the mixture into a column, feeding water into the same column at a higher level but below the top of the column, maintaining the column at a temperature below the boiling point of the binary constant boiling mixture of water and the alcohol and above the boiling point of the binary constant boiling mixture of acetone and the cyclic ether, removing the acetone-cyclic ether mixture in the vapor phase and the aqueous alcohol in the liquid phase, adding to the acetone-cyclic ether mixture a normally liquid light paraffin hydrocarbon, and distilling off the constant boiling mixture formed by the acetone and the hydrocarbon.

6. A method of separating into its components a mixture of methyl alcohol, acetone and tetramethylene oxide, which substances form a ternary constant boiling mixture, which comprises feeding the mixture into a column, feeding water into the same column at a higher level but below the top of the column, maintaining the column at a temperature below the boiling point of the binary constant boiling mixture and the alcohol and above the boiling point of the binary constant boiling mixture of acetone and tetramethylene oxide, removing the acetone-tetramethylene oxide mixture in the vapor phase and the aqueous alcohol in the liquid phase, adding pentane to the acetone-tetramethylene oxide mixture, and distilling off the constant boiling mixture formed by the acetone and the pentane.

JOSEPH E. BLUDWORTH.